United States Patent [19]

Baskin

[11] 3,864,840
[45] Feb. 11, 1975

[54] LYOPHILIC WASTE DISPOSAL
[75] Inventor: Steven I. Baskin, East Lansing, Mich.
[73] Assignee: Donnell R. Matthews, Jr., Lansing, Mich.
[22] Filed: July 16, 1973
[21] Appl. No.: 379,242

[52] U.S. Cl.............................................. 34/5, 34/92
[51] Int. Cl............................................... F26b 5/06
[58] Field of Search............................. 34/5, 15, 92

[56] References Cited
UNITED STATES PATENTS

| | | | |
|---|---|---|---|
| 2,751,687 | 6/1956 | Colton | 34/92 X |
| 3,032,890 | 5/1962 | Brick et al. | 34/92 |
| 3,226,318 | 12/1965 | Schick | 34/5 X |
| 3,234,661 | 2/1966 | Nerge | 34/92 X |
| 3,324,565 | 6/1967 | Smith, Jr. | 34/92 X |
| 3,648,379 | 3/1972 | Mercer et al. | 34/92 X |
| 3,681,851 | 8/1972 | Fleming | 34/5 |
| 3,731,392 | 5/1973 | Gottfried | 34/5 |

Primary Examiner—Manuel A. Antonakas
Assistant Examiner—William C. Anderson
Attorney, Agent, or Firm—Whittemore, Hulbert & Belknap

[57] ABSTRACT

Wet sewage, which may contain or be mainly composed of human waste, is treated to remove readily separable liquid components and is then comminuted. The wet comminuted waste material is then compressed into a relatively thin layer, frozen, and then subjected to a vacuum to remove by sublimation all of the liquid components, leaving the solid material in a completely dry form. Preferably, the foregoing is accomplished in a continuous process and the material is subjected to different stages of vacuum, with or without controlled heating, so as to perform a selective removal of frozen liquid components by sublimation. Preferably, the system is arranged to collect selected vapors, usually by condensation.

25 Claims, 2 Drawing Figures

LYOPHILIC WASTE DISPOSAL

BRIEF SUMMARY OF THE INVENTION

At the present time the disposal of wet sewage, as contrasted to the disposal of dry materials such as paper, metal, plastic and the like, is posing an increasingly difficult problem. Where realistic efforts are made to avoid contamination of streams, the proposed solutions include depositing the wet waste material, some times in a further diluted condition, over relatively large acreages. Obviously, with this type of disposal, a limit will be reached by unavailability of the necessary acreage, and by the fact that the spreading of this material over large areas produces a very serious air contamination problem for surrounding areas.

On the other hand, if all of the liquid components of the wet waste material is removed, leaving the solid material in a perfectly dry condition, this solid material is in condition for packaging and use, such for example as a fertilizer or conceivably as a fuel.

Drying the wet waste material by the application of heat under normal pressure conditions is impractical.

In accordance with the present invention the wet waste material is first treated by separating the solids from readily removable liquids, leaving wet sewage or waste material. This material is then comminuted as for example by forcing it through a screen with openings of appropriate size, and is then compressed into a relatively thin layer, as for example 0.5 to 2.0 inches. This layer is then quickly frozen. The material may be compressed against a moving belt and frozen by advancing the belt in contact over the surface of a refrigerating device in heat transfer relationship, this operation preferably taking place within a refrigerated enclosure. Thereafter, the compressed frozen layer is subjected to high vacuum conditions, with or without the application of controlled heating thereto to vaporize the frozen liquid components by sublimation. This operation is referred to as lyophilization.

Preferably, the lyophilization takes place in an elongated tank, the interior of which is continuously evacuated to maintain the predetermined vacuum and to remove the vapors sublimated from the frozen waste material. Sealing means are provided comprising opposed rollers above and below the belt adapted to compress the frozen waste material sufficiently to provide an effective seal. It is within the contemplation of the present invention that the interior of the tank may be separated into two or more compartments, suitably sealed from each other by pairs of rollers as described above, and the compartments may be subjected to different vacuum conditions with or without controlled heating so as to remove in vapor form by sublimation only a predetermined fluid or range of fluids in each compartment.

The means for providing for continuous evacuation of the tank or series of compartments preferably includes means for collecting the removed vapors, usually by condensing apparatus of conventional design.

DETAILED DESCRIPTION

Figures 1, 2:
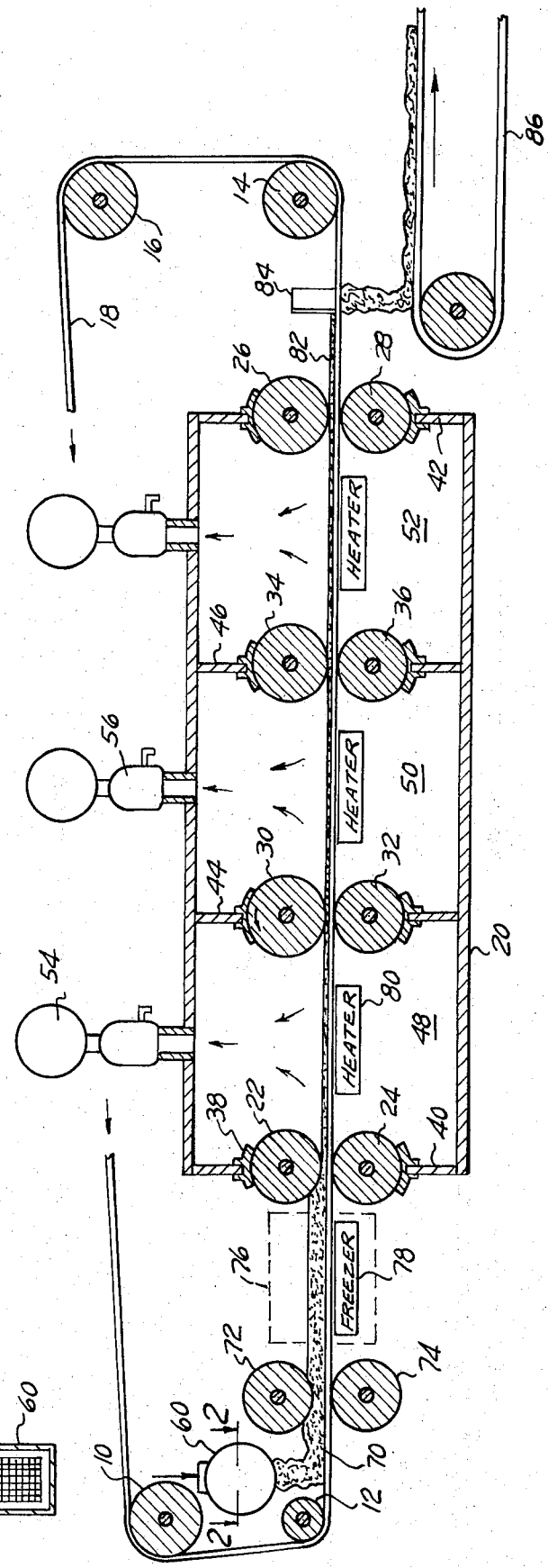
FIG. 1 is a diagrammatic view of the apparatus disclosed herein.
FIG. 2 is a fragmentary sectional view on the line 2—2, FIG. 1, partly in elevation.

The system as illustrated in FIG. 1 comprises guide rollers 10, 12, 14 and 16, and such additional rollers as are required for adequate support, for supporting and driving a relatively wide belt 18. The belt 18 is preferably composed of heat conducting material such for example as metal.

The belt passes through an elongated tank 20 having sealing inlet rollers 22,24; exit sealing rollers 26 and 28; and intermediate sealing rollers 30,32 and 34,36. The sealing rollers are associated with sealing shoes 38 of the shape illustrated and formed of suitable material such for example as rubber or a synthetic rubber-like material. Suitable spring means (not shown) urge the rollers into sealing pressure contact with the belt and material to accommodate variations in thickness of material or gaps therein. The end walls 40 and 42 of the tank seal the interior of the tank from atmosphere and permit it to be maintained under predetermined relatively high vacuum conditions. Intermediate partitions 44 and 46 divide the interior of the tank into a plurality of compartments indicated generally as 48, 50 and 52. Associated with each of the compartments 48, 50 and 52 is a vacuum pump 54 which may be of conventional design but which is adapted to maintain a predetermined relatively high vacuum within the compartment with which it is associated. Preferably, each of the vacuum pumps is associated with a device 56 for separating and collecting the frozen waste material. In the case of materials which are liquid under normal atmospheric conditions, these separators may comprise conventional condensers and the condensed vapors may be withdrawn in liquid form. In the case of materials which are in the form of vapor under normal atmospheric conditions, these materials may be collected by condensing them at reduced temperatures at which they are liquid and withdrawing them either in liquid or vapor condition.

The wet sewage or waste material is first separated from readily removable liquid by suitable conventional means (not shown) such as by screening, settling tanks, or the like. This leaves the solid material in the form of a very wet solid material containing a substantial percentage of water or other liquids. This material is advanced through a feed conduit 60 including a feed screw 62 driven by a motor 64. An inlet for the wet waste material is indicated at 66, and overlying the belt 18 the feed conduit is provided with a comminuting screen 68 having openings to predetermine the size of the comminuted wet waste material as it is deposited as indicated at 70 on the advancing belt.

After the wet waste material has been deposited on the belt it is compressed thereon by rollers 72 and 74 placed respectively above and below the belt and spaced apart to reduce the thickness of the layer of wet waste material to a predetermined value as for example, between 0.5 and 2.0 inches.

Thereafter, the belt advances and means are provided to subject the wet compressed layer of waste material to a quick freezing action. As illustrated in FIG. 1, this may comprise a chamber 76 the interior of which is maintained at a suitable low temperature by conventional refrigerating means (not shown). However, the quick freezing is primarily the result of advancing the heat conducting belt 18 in sliding, heat transfer relationship over a freezing unit 78, the upper surface of which is maintained at a suitable low temperature to provide complete freezing of liquids in the moist waste material.

The frozen waste material on the belt then pases between the sealing rollers 22,24 at the entrance to the tank 20, and these rollers are spaced apart in accordance with the initial thickness of the compressed layer of frozen material to a degree sufficient to provide an adequate seal and thus, to prevent inflow of air into the tank 20. The vacuum pump 54 maintains the compartmennt 48 at a predetermined vacuum condition selected in accordance with the frozen fluids which are to be removed from the solid waste material. Preferably, controlled electrical heaters 80 are provided in each compartment. The temperature of the frozen waste material, the rate of advance of the belt 18, the degree of vacuum within the compartment or chamber 48, and the amount of heat supplied to the frozen waste material, are all controlled to produce removal of all of the selected components of the frozen fluid material within the chamber.

In a simple case, the interior of the tank may constitute a single compartment and the parameters of the variables which control lyophilization may be selected such as to completely remove all frozen fluids. Where the frozen fluids are essentially water, this water may be dissipated in the atmosphere as water vapor, or it may be condensed and collected for reuse.

However, in the illustrated embodiment of the invention the interior of the tank 20 is separated by the partitions 44 and 46 into compartments 48, 50 and 52. In this case the vacuum conditions and the optional application of heat to the frozen waste material are controlled so as to effect selected removal of the fluid constituents of the waste material. The most volatile fluids, such for example as methane, may be removed from the waste material and chamber 48, under somewhat lower vacuum conditions than those which prevail in successive compartments. In the intermediate compartment 50, removal of the frozen fluid components may be carried out under conditions which remove normally liquid or gaseous fluid components from the waste material. Finally, in compartment 52, conditions may be such as to eliminate water and any other remaining normally liquid material from the waste material, leaving the waste material in completely dry condition.

The differential vacuums in the compartments 48, 50 and 52 are of course maintainable by virtue of the intermediate sealing rollers 30,32 and 34,36, which in addition to constituting a seal, will further compress the material as necessary to maintain the sealed condition resulting from the removal of fluid constituents therefrom.

As the completely dry layer of waste material emerges from the tank 20, as indicated at 82, it encounters a scraper 84 which may be inclined diagonally across the belt as illustrated, which removes the dry waste material and permits it to fall on a conveyor belt 86 which transfers the dry waste material for packaging, storage, or disposal.

The foregoing system in its broadest aspects separates solids from wet sewage or waste material in a completely dry usable condition. As a secondary advantage, the fluid components of the wet waste material may be separated into differently usable components as hereinbefore described.

If considered necessary or desirable, the waste material may be subjected to sterilization either within the tank or exteriorly thereof by suitable means (not shown) which will kill all or any required part of the bacterial content thereof.

What we claim as our invention is:

1. The method of treating wet sewage containing solid pieces which comprises compacting the mass of wet solid pieces into a thin continuous layer, freezing the layer, subjecting the layer in a substantial vacuum to mild heating to vaporize by sublimation all of the liquids therein, and collecting the fully dried solid material for subsequent use.

2. The method of claim 1 which comprises compacting the mass to form a layer 0.5 – 2.0 inches in thickness.

3. The method of claim 1 which comprises compacting the material on a moving belt, and advancing the belt to subject the material to substantial vacuum and mild heating.

4. The method of claim 3 which comprises continuously advancing the frozen compacted material on a moving belt through sealing means into an elongated evacuated chamber.

5. The method of claim 1 which comprises subjecting the material to progressively higher vacuum conditions to remove normally liquid and gaseous components in the order of volatility, and separately collecting different normally fluid components.

6. The method of claim 5 which comprises subjecting the material to progressively greater heating as the vacuum increases.

7. The method of claim 1 which comprises forcing the wet solids through a screen to comminute the wet solid material.

8. The method of claim 7 which comprises initially separating readily separable liquids from the solids.

9. The method of treating essentially fluid sewage which comprises depositing the sewage continuously on a continuously moving belt to a predetermined thickness, freezing the material on the belt, passing the belt with the frozen material thereon into an evacuated chamber through a pair of opposed sealing rolls, subjecting the compacted frozen material within the chamber to controlled temperature and high vacuum conditions to remove substantially all liquids from the material by the process of lyophilization, causing the belt with the substantially dry compacted material thereon to exit from the chamber between opposed pressure sealing rolls to permit maintainance of high vacuum conditions within the chamber, and finally removing the dried material from the belt.

10. The method of claim 9 which comprises advancing the belt within the chamber through partitions dividing the chamber into separate compartments and having sealing rolls at each partition which provides for maintainance of different vacuum conditions in such compartments, and maintaining such different vacuum conditions within the compartments.

11. Apparatus for separating solids in completely dry usable condition from wet sewage comprising an elongated vacuum tank, a belt movable longitudinally through said tank, means for continuously moving said belt, means for continuously depositing wet sewage material containing solids on said belt exterior of said tank, means for compacting the wet material on the belt, means for freezing the liquids contained in the wet sewage on the belt just prior to entrance into said tank, sealing means for said belt and the compacted material on said belt at the entrance to and exit from said tank, and means for evacuating the interior of said tank.

12. Apparatus as defined in claim 11 in which said sealing means comprises opposed rollers at opposite sides of said belt which compress the frozen material against said belt.

13. Apparatus as defined in claim 12 comprising in addition heating means within said tank to supply heat to said frozen material to sublime frozen fluids therefrom.

14. Apparatus as defined in claim 12 comprising means for continuously evacuating said tank to maintain a predetermined vacuum condition and to remove vapor sublimed from said material.

15. Apparatus as defined in claim 11 in which the means for freezing said material comprises refrigerating means in position to engage said belt in heat transfer relation.

16. Apparatus as defined in claim 15, said freezing means comprising in addition a refrigerated enclosure in which said refrigerating means is located.

17. Apparatus as defined in claim 11 in which the means for freezing said material comprises refrigerating means in position to engage said belt in heat transfer relation.

18. Apparatus as defined in claim 17, said freezing means comprising in addition a refrigerated enclosure in which said refrigerating means is located.

19. Apparatus as defined in claim 11 comprising in addition heating means within said tank to supply heat to said frozen material to sublime frozen fluids therefrom.

20. Apparatus as defined in claim 19 comprising means for continuously evacuating said tank to maintain a predetermined vacuum condition and to remove vapor sublimed from said material.

21. Apparatus as defined in claim 11 comprising means for continuously evacuating said tank to maintain a predetermined vacuum condition and to remove vapor sublimed from said material.

22. Apparatus as defined in claim 11 comprising means for separating said tank into longitudinally spaced sections, sealing means associated with said belt to provide for different vacuum conditions in said sections, means for continuously evacuating said sections to maintain predetermined vacuum conditions and to remove sublimed vapors of different fluids from said sections, and means for collecting said vapors.

23. Apparatus as defined in claim 22 in which the means for collecting said vapors comprise condensing means for vapors of normally liquid material.

24. Apparatus as defined in claim 22 in which the sealing means to provide for different vacuum conditions in said sections comprises partitions including pressure sealing rolls engageable with the material on said belt.

25. Apparatus as defined in claim 24, said sealing means comprising pairs of opposed sealing rolls, in which one roll of each pair engages the underside of said belt and the other roll engages the surface of the material on said belt.

* * * * *